April 23, 1940.

C. C. FARMER 2,198,029

WHEEL SLIP CONTROL MEANS

Filed May 24, 1938

INVENTOR
CLYDE C. FARMER
BY
ATTORNEY

Patented Apr. 23, 1940

2,198,029

UNITED STATES PATENT OFFICE 2,198,029

WHEEL SLIP CONTROL MEANS

Clyde C. Farmer, Pittsburgh, Pa., assignor to The Westinghouse Air Brake Company, Wilmerding, Pa., a corporation of Pennsylvania Application May 24, 1938, Serial No. 209,648

24 Claims. (Cl. 303—21)

This invention relates to wheel-slip control means for vehicles, such as railway cars or trains, and particularly to vehicle brake systems having control means automatically responsive to the slipping of an individual wheel and axle unit for releasing the brakes on the slipping wheels to prevent sliding thereof.

As is well known, when the brakes associated with a vehicle wheel are applied with sufficient force to exceed the limit of adhesion between the tread or rim of the wheel and the road surface or rail, the wheel rapidly decelerates toward a locked or non-rotative condition. If the braking force on a slipping vehicle wheel is rapidly reduced at the intant that a wheel begins to slip, the vehicle wheel will cease to decelerate and accelerate back toward a rotative speed corresponding to vehicle speed without actually attaining the locked or non-rotative condition.

For convenience, the term "slip" or "slipping" is applied herein to the rotation of a vehicle wheel at a speed less than a rotative speed corresponding to vehicle speed at a given instant, whether the wheel is decelerating or accelerating. The term "slide" or "sliding" is employed herein to designate the dragging of a vehicle wheel along a road surface or rail in a locked or non-rotative state. Thus it should be understood that a slipping wheel is one which is rotating whereas a sliding wheel is one which is not rotating.

In order to minimize the possibility of repeated slipping cycles of deceleration and acceleration with respect to a speed corresponding to vehicle speed, it is desirable to avoid the reapplication of the brakes on a slipping wheel until it returns fully to a speed corresponding to vehicle speed.

Various types of brake control equipment for this purpose have been proposed, including that described and claimed in my copending application Serial No. 137,956, filed April 20, 1937, now Patent 2,140,620.

My present invention comprises a novel control arrangement for preventing the reapplication of the brakes on a slipping wheel until it has attained a rotative speed corresponding substantially to a speed corresponding to vehicle speed. The principle of operation of the control equipment of my invention is based on the fact that deceleration of a slipping wheel can be stopped and acceleration thereof back toward a speed corresponding to vehicle speed produced in response to a relatively small amount of reduction in the braking force from that which initiated the slipping of the wheel when the reduction is effected rapidly and substantially at the instant that the wheel begins to slip.

My invention includes a fluid pressure responsive device normally unresponsive to the pressure in the brake cylinder associated with a particular vehicle wheel, and a device which is instantly responsive to the slipping of the wheel for causing the fluid pressure responsive device to be operated to effect release of fluid under pressure from the brake cylinder, the fluid pressure device being thereafter so controlled by the pressure in the brake cylinder that the reduction of brake cylinder pressure to a certain low value is guaranteed independently of subsequent variations in the rotative condition of the vehicle wheel. When the brake cylinder pressure is reduced below the certain low pressure, the fluid pressure responsive device is operative to cause fluid under pressure to be resupplied to the brake cylinder to effect reapplication of the brakes.

By thus guaranteeing or insuring the reduction of brake cylinder pressure to a relatively low pressure, the reapplication of the brakes is held off while the vehicle wheel is accelerating back toward a speed corresponding to vehicle speed. Such holding off of the reapplication of the brakes is in most cases sufficient to permit the return of the slipping wheel fully to a speed corresponding to vehicle speed before reapplication of the brakes is effected.

If the friction in the brake rigging of a conventional clasp brake is high, as is sometimes the case, the braking force applying the brake shoes is not instantly reduced upon reduction of brake cylinder pressure so that it may sometimes be necessary to reduce the brake cylinder pressure to a low value in order to cause release of the brakes so that a slipping wheel may begin to accelerate back toward a speed corresponding to vehicle speed. Accordingly, by guaranteeing the reduction of brake cylinder pressure to a low value, my invention positively insures the cessation of deceleration of a slipping wheel and its acceleration back toward a speed corresponding to vehicle speed.

Furthermore, if the adhesion between a car wheel and rail is low, the acceleration of a slipping wheel back toward a speed corresponding to vehicle speed will be at a slower rate than when the adhesion between the wheel and the rail is high. Thus, due to variation in brake rigging friction and to variation in the adhesion between the wheel and the rail the time interval elapsing between the instant that a vehicle wheel begins to slip and the instant that it returns to a speed corresponding substantially to vehicle speed will vary. In order therefore to insure that the slipping vehicle wheel will return fully to a speed corresponding to vehicle speed before any substantial degree of reapplication of the brakes is effected thereon, my invention also provides for restricting the rate of reapplication of the brakes on a slipping wheel.

It is accordingly an object of my invention to provide a vehicle brake equipment including means effective, once a vehicle wheel begins to slip, for insuring or guaranteeing the reduction in the braking force or brake cylinder pressure to a relatively low degree so as to prevent the reapplication of the brakes on the slipping wheel until the slipping wheel returns substantially to a speed corresponding to vehicle speed, and also so as to insure the cessation of deceleration of a slipping wheel and its acceleration back toward a speed corresponding to vehicle speed.

Another object of my invention is to provide a vehicle brake equipment including means automatically effective, once a vehicle wheel slips, to restrict the rate of reapplication of the brakes on the slipping wheel.

Another object of my invention is to provide a vehicle brake equipment of the character indicated in the foregoing object in which the means for controlling the rate of reapplication of the brakes on a slipping wheel is operated and controlled by fluid under pressure vented from the brake cylinder associated with a slipping wheel.

The above objects, and other objects of my invention which will be made apparent in the subsequent description thereof, are attained by several embodiments shown in the accompanying drawings, wherein.

Figures 1, 2:
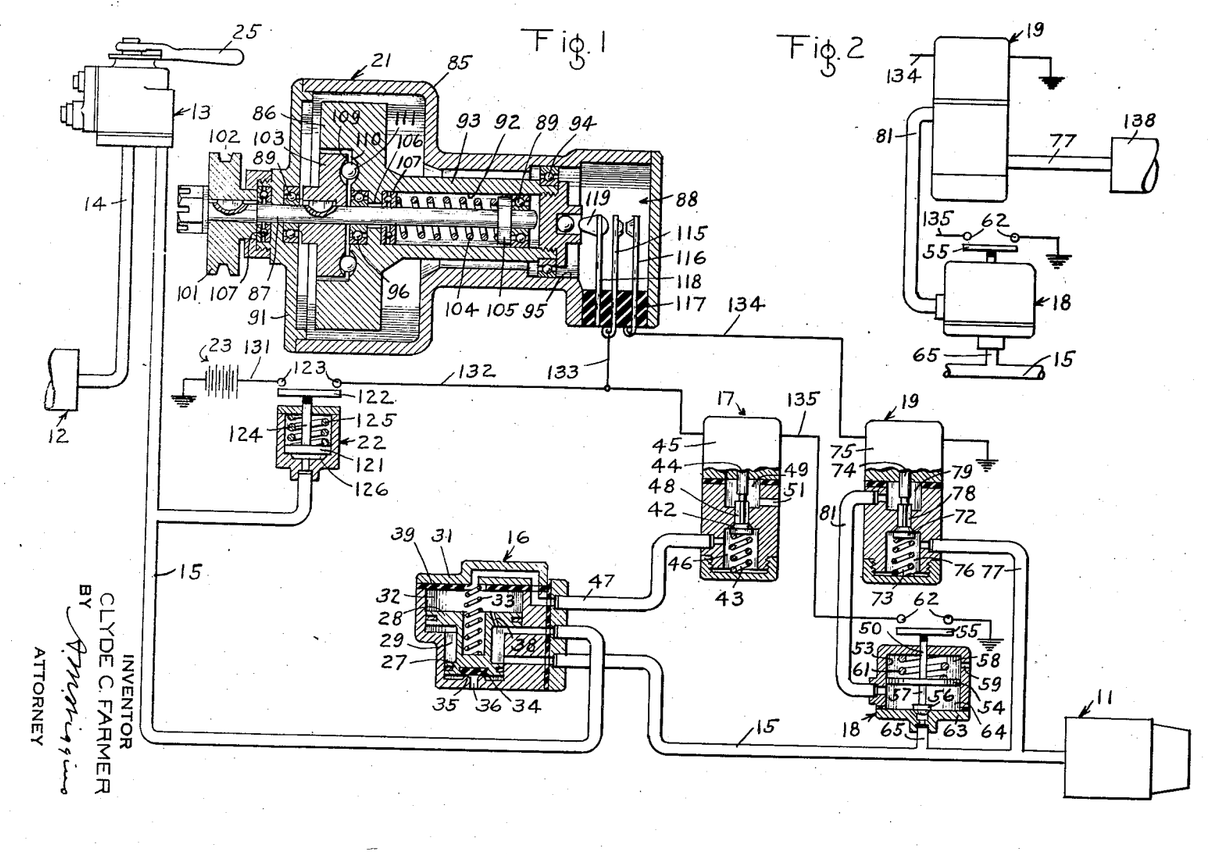
Fig. 1 is a simplified diagrammatic view of a brake equipment embodying my invention.
Figs. 2, 3 and 4 are fragmentary views showing various other embodiments of my invention respectively, which differ somewhat from the arrangement shown in Fig. 1.

*Description of embodiment shown in Fig. 1*

Before proceeding to a detailed description of my invention, it should be understood that, for simplicity, the various embodiments shown and described herein include only those elements necessary to an understanding of my invention but that, in practice, my invention will be applied to brake control systems for modern high speed trains employing governor devices operative according to the speed of the train or retardation controller devices responsive to the rate of retardation of the train for automatically reducing the degree of application of brakes on the train as the speed of the train reduces under an application of the brakes. Examples of such modern high speed train brake equipment are described and claimed in the Patents 2,147,295 and 2,140,624 of Ellis E. Hewitt.

It should accordingly be understood that as distinguished from such types of brake control systems wherein the degree of a brake application on all wheel and axle units of a train of cars is controlled simultaneously and uniformly, the apparatus of my present invention controls the brakes on an individual pair or pairs of wheel and axle units. Thus a complete brake equipment may provide automatic control of the brakes on all wheel and axle units by means of a speed governor or retardation controller device in addition to the control of individual wheel and axle units by the apparatus of my present invention, and this is an important fact to bear in mind in the subsequent description of the operation of my invention, as will be made more apparent hereinafter.

Referring to Fig. 1, the equipment shown comprises a brake cylinder 11 for effecting application and release of the brakes associated with one or more vehicle wheels, not shown, a source of fluid under pressure such as a main reservoir 12, and a manually operated brake valve device 13 for controlling the supply of fluid under pressure from a supply pipe 14, connected to the main reservoir 12, to a so-called straight air pipe 15 leading to the piston chamber in the brake cylinder 11. The equipment also includes, according to my invention, a release and reapplication valve device 16, hereafter referred to as the release valve, interposed in the straight-air pipe 15, a magnet valve device 17 for controlling the operation of the release valve 16, a fluid pressure operated switch device 18 for controlling the magnet valve device 17, a magnet valve device 19 for in part controlling the operation of the fluid pressure operated switch device 18, a wheel-slip responsive device 21 associated with one of the wheels with which the brake cylinder 11 is associated, a pressure-operated switch 22 for controlling both the magnet valve devices 17 and 19, and a source of electric current indicated as a storage battery 23.

Considering the parts of the equipment in greater detail, the brake valve 13 is of a self-lapping type, such as described and claimed in Patent 2,042,112 of Ewing K. Lynn and Rankin J. Bush. The details of construction of the brake valve 13 are not necessary to an understanding of my invention and accordingly it is described herein only functionally. When the operating handle 25 of the brake valve 13 is in its normal release position, the brake valve device 13 vents the straight-air pipe 15 to atmosphere. When the handle 25 is shifted horizontally into a so-called application zone out of its normal release position, the brake valve 13 establishes communication through which fluid under pressure is supplied from the supply pipe 14 to the straight-air pipe 15, the brake valve 13 being automatically self-lapping to establish a pressure in the straight-air pipe 15 substantially proportionate to the degree of displacement of the operating handle out of its normal release position. Should the pressure in the straight-air pipe 15 tend to reduce, due to leakage, from a pressure corresponding to the position of the operating handle, the brake valve 13 is automatically operative to supply further fluid under pressure to the straight-air pipe. The purpose and the utility of this pressure-maintaining feature of the self-lapping brake valve 13 will be made apparent hereinafter.

The release valve 16 is of well known construction being of a conventional type employed in modern high speed railway brake equipment. The purpose of the release valve is, briefly, to close communication through the straight-air pipe 15 and vent fluid under pressure from the brake cylinder 11 at a rapid rate.

The release valve 16 comprises a sectionalized casing containing a piston valve 27 and an operating piston 28 connected to the valve 27 by a stem 29. Formed between the operating piston 28 and the end or cover section 31 of the casing that closes the bore in which the piston 28 operates is a chamber 32. Contained in the chamber 32 in interposed relation between the operating piston 28 and the casing section 31 is a coil spring 33 which is effective normally to urge the piston downwardly so as to cause a gasket 34 inset in the face of the piston valve 27 to seat on an annular rib seat 35 which surrounds an exhaust or vent port 36.

With the piston valve 27 seated on the annular rib seat 35, one portion of the straight-air pipe 15 leading from the brake valve 13 and the other portion of the straight-air pipe 15 leading to the brake cylinder 11 are connected into the annular chamber 37 formed between the operating piston 28 and the piston valve 27. Accordingly, with the piston valve 27 positioned as shown in the drawings, fluid under pressure may be supplied or released through the straight-air pipe 15 to and from the brake cylinder 11 under the control of brake valve 13.

The chambers 32 and 37 on opposite sides of the operating piston 28 are connected through a restricted port 38 in the operating piston. Thus, if fluid under pressure is prevented from flowing out of the chamber 32, chamber 32 becomes charged rapidly by flow of fluid under pressure from the chamber 29 through the port 38 in the operating piston 28 so that, while a certain differential pressure is produced momentarily on the piston in the chambers 37 and 32, nevertheless such pressure differential is insufficient to cause upward movement of the operating piston and unseating of piston valve 37 from the annular rib seat 35. However, if the pressure in chamber 32 is suddenly reduced while the operating piston 28 is subject to the pressure of fluid supplied into the straight-air pipe 15 and acting on the lower face of the operating piston 28 in the chamber 37, the differential force of the pressure in chamber 37 over that in the chamber 32 lifts the piston 28 upwardly against the yielding resisting force of the spring 33 and accordingly unseats the piston valve 27 from the annular rib seat 35.

When shifted upwardly, the operating piston 28 seats on an annular gasket 39 supported on the casing section 31. With the operating piston 28 in its raised position in contact with the annular gasket 39, the piston valve 27 is correspondingly shifted upwardly to a point between the openings of two portions of the straight-air pipe 15 into chamber 37, thus effectively closing communication through which fluid under pressure may be supplied from the brake valve 13 to the brake cylinder 11 and at the same time opening the portion of the straight-air pipe 15, connected to the brake cylinder, to atmosphere through the exhaust port 36.

If the chamber 32 continues to be vented, the continued supply of fluid under pressure from the brake valve 13 to the annular chamber 37 beneath the operating piston 28 holds the operating piston in contact with the annular gasket seat 39 and thus maintains the piston valve 27 in its raised position so that venting of fluid under pressure from the brake cylinder continues. This is a feature which should be kept in mind in the later description of the operation of my invention.

Magnet valve device 17 is provided for effecting reduction of pressure in the chamber 32 of the application valve device 16. Briefly, magnet valve 17 comprises a casing containing a valve 42 of the poppet type which is seated under the influence of a coil spring 43 and unseated against the force of the spring 43 by the magnetic force exerted on a plunger 44 upon energization of a solenoid or electromagnet winding 45 associated with the plunger. The valve 42 is contained in a chamber 46 which is constantly connected through a pipe and passage 47 to the chamber 32 of the application valve device 16. The valve 42 has a fluted stem 48 which extends slidably through a suitable bore connecting the chamber 46 and a chamber 49 that is constantly connected to atmosphere through an exhaust port 51. The plunger 44 contacts the upper end of the fluted stem 48 of the valve 42 within the atmospheric chamber 49.

It will be seen that when the electromagnet winding 45 of the magnet valve device 17 is deenergized, the valve 42 is seated by the spring 43, thus preventing the escape of fluid under pressure from the piston chamber 32 of the application valve 16. It will also be seen that when the electromagnet winding 45 of the magnet valve 17 is energized and the valve 42 consequently unseated, the chamber 32 of the application valve 16 is connected to atmosphere and fluid under pressure is vented therefrom through the exhaust port 51 of the magnet valve 17.

Fluid pressure operated switch 18 is provided for controlling energization and deenergization of the electromagnet winding 45 of the magnet valve device 17. As diagrammatically shown in Fig. 1, the switch device 18 comprises a casing having a bore 53 containing a loose-fitting piston 54 which is effective to operate a movable switch member 55 and a valve 56 of the poppet type. As illustrated, the switch member 55 is carried in insulated relation on a stem 50 of the piston 54 and valve 56 is formed or carried on the end of a stem 57 on the opposite side of the piston 54 to the stem 50.

Interposed between the casing and the upper face of the piston 54 within a chamber 58 that is constantly connected to atmosphere through a port 59, is a coil spring 61 which urges the piston 54 downwardly to a position in which the switch member 55 disengages a pair of associated stationary contact members 62, suitably supported by the casing in a manner not shown, and in which the valve 56 seats on an associated valve seat formed on the end casing section 63 that closes the open end of the bore 53.

Valve 56 controls communication between a chamber 64, formed between the piston 54 and the casing section 63, and that portion of the straight-air pipe 15 connecting the release valve 16 to the brake cylinder 11, a branch pipe and passage 65 being provided to connect the straight-air pipe 15 to the chamber 64 of switch device 18.

Spring 61 is of such strength as to normally maintain the valve 56 seated and the switch member 55 in circuit-opening position out of contact with the contact members 62 against the maximum force of the fluid pressure in the straight-air pipe 15 acting on the inner seated area of the valve 56 and tending to unseat the valve 56. However, if fluid under pressure is supplied independently of valve 56 to the chamber 64, the force exerted on the relatively large area of the piston 54 is effective to overcome the resisting force of the spring 61 and shift the piston 54 upwardly to unseat the valve 56 and shift the switch member 55 into contact with the contact members 62.

It will be seen, therefore, that normally the pressure of the fluid in the brake cylinder 11 and straight-air pipe 15 is ineffective to cause shifting of the switch member 55 into circuit-closing position and that after the switch member 55 is once shifted into circuit-closing position and the valve 56 unseated, the pressure in the brake cylinder and straight-air pipe 15 is effective to maintain the piston 54 in raised position so as to maintain the switch member 55 in circuit-closing position.

The strength of the spring 61 is so designed in relation to the area of the piston 54 that the pressure in the straight-air pipe 15 and brake cylinder 11 acting on the piston 54 will maintain the switch member 55 in circuit-closing position unless and until the pressure in the brake cylinder or straight-air pipe reduces below a certain uniform low pressure, such as five pounds per square inch.

The piston 54 is made to have a loose fit in the bore 53 to permit the escape of fluid under pressure past the piston from the chamber 64 to the atmospheric chamber 58 in the event of leakage past the valve 56 from the straight-air pipe 15, so that undesired build-up of pressure in chamber 64 and the consequent undesired operation of the switch member 55 to circuit-closing position is prevented.

It will be seen, therefore, that in order to initially effect operation of the switch member 55 of the switch device 18 to circuit-closing position, it is necessary to first supply fluid under pressure to the chamber 64 of the switch device 18, and the magnet valve 19 is accordingly provided for this purpose.

The magnet valve 19 is similar to the magnet valve 17 and comprises a suitable casing containing a valve 72 yieldingly biased into seated relation on an associated valve seat by a coil spring 73 and unseated by the magnetic force exerted on a plunger 74 when an electromagnet winding or solenoid 75 associated with the plunger 74 is energized. Valve 72 is contained in a chamber 76 which is constantly connected through a branch pipe and passage 77 to the straight-air pipe 15 at a point adjacent the brake cylinder 11. The fluted stem 78 of the valve 72 extends slidably through a suitable bore connecting the chamber 76 and a chamber 79 that is constantly connected to the chamber 64 of the switch device 18 by a pipe 81.

It will accordingly be seen that when the electromagnet winding 75 of the magnet valve 19 is energized and the valve 72 unseated, fluid under pressure is supplied from the straight-air pipe 15 and the connected brake cylinder 11 to the chamber 64 of the switch device 18 and that when the electromagnet 75 is deenergized such supply is cut off due to the seating of the valve 72.

The wheel-slip responsive device 21 is provided for controlling energization and deenergization of the electromagnet winding 75 of the magnet valve 19. Any suitable type of wheel-slip responsive device may be provided and, for purposes of illustration, a wheel-slip responsive device of the type described in detail and claimed in my above-referred to Patent 2,140,620 is shown.

The wheel-slip responsive device 21 comprises a tubular casing 85 in which is contained a rotary inertia element in the form of a fly-wheel 86, a driving shaft 87 for the fly-wheel, and a switch device 88. The driving shaft 87 is supported at opposite ends thereof by ball bearings 89, one of the bearings being contained in the end cover 91 of the casing 85 and the other of the bearings being slidably supported within a bore 92 in the laterally projecting hub portion 93 of the fly-wheel 86.

The fly-wheel 86 is supported for rotation within the casing by a ball bearing 94 at the end of the hub portion 93 which bearing is arranged to move slidably in a bore 95 of the casing, and by another ball bearing 96 at the opposite end of the hub portion in a suitable recess in the face of the fly-wheel which bearing is arranged to rotatably and slidably support the fly-wheel on the shaft 87.

Suitably fixed to the outer end of the shaft 87 which projects through the end cover 91 of the casing is a pulley 101 having an anular groove 102 therein for receiving an endless belt which is driven in any suitable manner according to the rotation of one of the vehicle wheels on which the brakes are applied by the brake cylinder 11.

The shaft 87 may be driven directly from the axle of the wheel by means of an endless belt or, indirectly, from any other element rotative according to the rotation of the wheel, as for example, the armature shaft of an electrical generator driven from the wheel axle. It will be understood that the driving connection to the pulley 101 on the shaft 87 is such as not to permit any slippage of the pulley 101 relative to the vehicle wheel except possibly under extraordinary circumstances to prevent breakage of mechanical parts due to unusual mechanical stresses.

The fly-wheel 86 is rotated by rotation of the shaft 87 through a clutch arrangement comprising a disc 103 fixed to the shaft, and a coil spring 104 so interposed between a collar or flange 105 fixed to the shaft 87 within the hub portion 93 of the fly-wheel and an annular shoulder 106 within the bore 92 of the hub portion 93 of the fly-wheel, as to urge the fly-wheel 86 and the disc 103 into interlocking or clutching engagement. Suitable thrust bearings 107 are provided for sustaining the axial thrust of the pulley 101 on the end cover 91 due to the force of the spring 104 and also the thrust of the spring 104, on the fly-wheel 86, so as to minimize the frictional forces resisting rotation of the shaft and the fly-wheel 86.

The disc 103 and fly-wheel 86 are interlocked by means of a plurality of spaced pairs of complementary registering recesses 109 and 110 in the juxtaposed faces of the disc and fly-wheel, in each of which pair of complementary recesses is contained a steel ball 111. Any suitable number of pairs of recesses 109 and 110 may be provided arranged in spaced circumferential relation at a given radial distance from the axis of the shaft 87. The recesses 109 and 110 are relatively short and have a substantially constant radius of curvature about the axis of the shaft 87 so that the recesses resemble somewhat the contour of a kidney bean.

Each of the recesses 109 and 110 varies in depth along the arc thereof with respect to the face of the disc or fly-wheel in which they are located, being deepest at the mid-point and sloping upwardly in opposite directions to the face of the disc or fly-wheel.

It will thus be seen that under the influence of the spring 104, the steel balls 111 normally seat in the deepest portion of each pair of complementary recesses 109 and 110 so that the fly-wheel 86 and the disc 103 are accordingly normally interlocked for rotation together.

The compressive force or strength of the spring 104 is such as to maintain the fly-wheel 86 and disc 103 in interlocking engagement, as shown, as long as either the disc or the fly-wheel does not accelerate or decelerate with respect to each other in excess of a certain rate corresponding, for example, to a ten mile per hour per second rate of retardation or acceleration of the vehicle wheel driving the shaft 87. Such a high rate of acceleration or deceleration of the vehicle wheel will not occur except by exceeding the limit of adhesion between the vehicle wheel and the rail surface along which the wheel rolls, that is, by slipping the wheel. Thus, when a vehicle wheel and the shaft 87 driven by the wheel are rotatively decelerated at a rate in excess of ten miles per hour per second when the wheel begins to slip, and subsequently accelerated at a rate in excess of ten miles per hour per second when the vehicle wheel accelerates back toward a speed corresponding to vehicle speed while slipping, the fly-wheel 86 shifts rotatively forward and then backward, relative to the disc 103. That is, when the shaft 87 decelerates at a rate corresponding to the deceleration of the vehicle wheel while slipping, the fly-wheel 86 tends to over-run, that is, rotate faster than or lead the shaft 87 and, when the shaft 87 accelerates according to the rate of acceleration of the vehicle wheel back toward a speed corresponding to vehicle speed while slipping, the fly-wheel 86 tends to lag behind or rotate slower than the shaft 87.

In view of the steel balls 111 interposed between the disc 103 and the fly-wheel 86, the rotative shift of the fly-wheel 86 relative to the disc, either forwardly or backwardly of its normal position, causes the fly-wheel 86 to be shifted axially in the right-hand direction against the yielding resisting force of spring 104.

The degree of rotative shift of the fly-wheel 86 relative to the disc 103 is limited to a degree which prevents the steel balls leaving the complementary recesses 109 and 110, as by one or more pins (not shown) in the disc or fly-wheel cooperating with arcuate slots or grooves (not shown) in the fly-wheel or disc, in the manner shown and described in my above-mentioned copending application.

The switch device 88 of the wheel-slip responsive device 21 comprises a pair of cooperating resilient contact fingers 115 and 116, each of which is fixed at one end to an insulating member 117 secured within the casing 85 at the end of the hub portion 93 of the fly-wheel. The contact fingers 115 and 116 are disposed in spaced parallel relation so that the free ends of the contact fingers are normally disengaged. When the fly-wheel 86 is shifted in the right-hand direction, as a result of shifting rotatively relative to the disc 103, the end of the hub portion 93 of the fly-wheel engages the free end of a resilient spring member 118 which is fixed at the opposite end in the insulating member 117 and bends it laterally against the contact finger 115 to shift it into contact with the contact finger 116. A tip 119 of insulating material is provided on the spring member 118 for engaging the contact finger 115, thus preventing the grounding of the contact finger 115 to the casing 85.

It will thus be understood that the wheel-slip responsive device 21 is representative of any suitable device for closing an electrical circuit substantially instantaneously upon the slipping of a vehicle wheel.

The pressure-operated switch 22 is diagrammatically shown as comprising a casing having a piston 121 for operating a movable switch member 122 into and out of contact with a pair of stationary spaced contact members 123 suitably carried in insulated relation on the casing. As shown, the switch member 122 is carried in insulated relation on a stem 124 of the piston. The piston 121 is subject on one side to the yielding force of a spring 125 which urges it downwardly to a limit position in which the switch member 122 is out of contact with the contact members 123. Formed in the casing at the side of the piston 121 opposite to the spring 125 is a chamber 126 which is constantly connected to that portion of the straight-air pipe 15 between the brake valve 13 and the release valve 16. The strength of the spring 125 is such that when the fluid pressure established in the straight-air pipe 15 and effective in chamber 126 on the piston 121 exceeds a relatively low pressure, such as two or three pounds per square inch, the resisting force of the spring 125 is overcome and the piston 121 is shifted upwardly to effect contact of the switch member 122 with the contact members 123 in circuit-closing relation.

One of the stationary contact members 123 of the pressure-operated switch 22 is connected by a wire 131 to one terminal, such as the positive terminal, of battery 23 and the other contact member 123 is connected by a wire 132 to one terminal of the electromagnet winding 45 of the magnet valve 17 as well as to the contact finger 115 of the wheel-slip responsive device 21 by a branch wire 133 of the wire 132. Contact finger 116 of the wheel-slip responsive device 21 is connected by a wire 134 to one terminal of the electromagnet winding 75 of the magnet valve 19 and the other terminal of the electromagnet winding 75 is connected to the negative terminal of the battery 23, as through a ground connection in the manner shown.

The terminal of the electromagnet winding 45 of the magnet valve 17 opposite to that connected to the contact member 123 of the switch 22 is connected by a wire 135 to one of the contact members 62 of the pressure-operated switch 18 and the other contact member 62 of the switch 18 is connected to the negative terminal of the battery 23, as through a ground connection in the manner shown.

It will thus be seen that with the pressure switch 22 and the switch 88 of the wheel-slip responsive device 21 both closed, a circuit is established for energizing the electromagnet winding 75 of the magnet valve 19. It will also be seen that with the pressure switches 18 and 22 both in circuit-closing position, a circuit is established for energizing the electromagnet winding 45 of the magnet valve 17.

*Operation of embodiment shown in Fig. 1*

Let it be assumed that the main reservoir 12 is charged to the normal pressure carried therein, as by a fluid compressor (not shown), that the car or train is traveling along the road under power and that it is desired to effect an application of the brakes. After first cutting off the propulsion power of the car or train, the operator shifts the brake valve handle 25 into the application zone an amount corresponding to a desired degree of application of the brakes. Fluid under pressure is accordingly supplied through the straight-air pipe 15 to the brake cylinder 11 and the pressure established in the straight-air pipe and the brake cylinder corresponds to the degree of displacement of the brake valve handle out of its normal release position.

As previously stated, the release valve 16 remains in the position shown to establish communication between the two portions of the straight-air pipe 15 and is not actuated out of such position except under circumstances hereinafter to be described.

Let it now be further assumed that the application of the brakes effected in the manner just described causes a vehicle wheel with which the brake cylinder 11 is associated to begin to slip. In such case the wheel-slip responsive device 21 is operated to close the switch device 88 thereof and accordingly establish the circuit for energizing the electromagnet winding 75 of the magnet valve 19, it being understood that the pressure switch 22 is in circuit-closing position due to the pressure established in the straight-air pipe 15. Magnet valve 19 operates in response to the energization of the electromagnet winding 75 thereof to cause fluid under pressure to be supplied from the straight-air pipe 15 and brake cylinder 11 to the chamber 64 of the pressure-operated switch 18, which is accordingly actuated to circuit-closing position to effect energization of the electromagnet winding 45 of the magnet valve 17.

Magnet valve 17 accordingly operates in response to the energization of the electromagnet winding 45 thereof to rapidly vent fluid under pressure from the piston chamber 32 of the release valve device 16, which in turn operates in response to such reduction of pressure in the chamber 32 to interrupt the supply communication through the straight-air pipe 15 and vent fluid under pressure from the brake cylinder 11 at a rapid rate through the exhaust port 36. It will be understood that in practice the release valve 16 is located close to the brake cylinder 11 to aid in effecting the rapid reduction of the pressure in the brake cylinder 11.

As previously explained, when fluid under pressure is once supplied to the piston chamber 64 of the pressure switch 18, the valve 56 is unseated and consequently direct communication is established between the chamber 64 and straight-air pipe 15 independently of the magnet valve 19. It will thus be seen that, independently of the rotative condition of the vehicle wheel and therefore of the wheel-slip responsive device 21, pressure switch 18 is maintained in circuit-closing position once it is shifted to circuit-closing position and remains in that position as long as the pressure in the brake cylinder 11 and the connected portion of the straight-air pipe 15 contains fluid at a pressure in excess of the five pounds per square inch pressure necessary to hold the contact member 55 in engagement with the contact members 62.

As previously pointed out, as long as the chamber 32 of the release valve 16 is connected to atmosphere, the piston valve 27 thereof is maintained in its raised or venting position. Therefore, it will be seen that since the pressure switch 18 is maintained in circuit-closing position as long as the brake cylinder pressure exceeds the low pressure of five pounds per square inch, the release valve 16 is also correspondingly maintained in venting position as long as the pressure in the brake cylinder exceeds the low pressure of five pounds per square inch. Consequently, the reduction of the pressure in the brake cylinder 11 to below five pounds per square inch is positively guaranteed, once the wheel-slip responsive device 21 operates in response to the initiation of slipping of the vehicle wheel to close the switch 88 thereof, independently of the subsequent opening of switch 88.

Due to the rapid reduction of pressure in the brake cylinder 11 and the consequent rapid release of the brakes on the wheel which begins to slip, the slipping wheel ceases decelerating and begins to accelerate back toward a speed corresponding to vehicle speed while the pressure in the brake cylinder is still considerably in excess of the predetermined low pressure required to maintain pressure switch 18 in circuit-closing position. It will accordingly be seen that the fly-wheel 86 of the wheel-slip responsive device 21 shifts from a leading to a lagging rotative position with respect to the disc 103 on the shaft 87 when the vehicle wheel changes from deceleration to acceleration. Momentarily, therefore, the fly-wheel 86 is shifted axially back to its normal position in a left-hand direction sufficiently to effect disengagement of the contact fingers 115 and 116 of the switch device 88 before returning in the right-hand direction again to effect reengagement of the contact fingers 115 and 116.

The electromagnet winding 75 of magnet valve 19 is thus momentarily deenergized but such momentary deenergization is ineffective to cause operation of the pressure switch 18 correspondingly to circuit-opening position because the pressure of the brake cylinder is still effective to maintain the switch 18 in circuit-closing position. It will be seen that the momentary deenergization of the electromagnet winding 75 of the magnet valve 19 due to the change in rotative condition of the vehicle wheel from deceleration to acceleration does not cause operation of the piston valve 27 of the release valve 16 from its venting position. Accordingly, once the vehicle wheel begins to slip, the reduction of brake cylinder pressure to below the certain uniform low pressure of five pounds per square inch is guaranteed independently of variation in the rotative condition of the vehicle wheel.

In view of the fact that the acceleration of a slipping wheel back toward a speed corresponding to vehicle speed is at a high rate, the slipping wheel will, under average conditions of adhesion between the wheel and rail, attain a speed corresponding to vehicle speed before the brake cylinder pressure reduces to the certain uniform low pressure of five pounds per square inch required to maintain pressure switch 18 in circuit-closing position.

When the pressure in the brake cylinder 11 reduces sufficiently to enable the spring 61 of the pressure switch 18 to effect operation of the switch member 55 to circuit-opening position, the electromagnet winding 45 of the magnet valve 17 is deenergized and consequently the exhaust communication for the piston chamber 32 of the release valve 16 is closed.

The restricted port 38 in the operating piston 28 of the application valve 16 is of sufficient size that, when the exhaust communication of the piston chamber 32 is closed, the pressure in the piston chamber 32 is rapidly built up to the pressure established in the chamber 37 on the opposite side of the piston communicating with the straight-air pipe 15. As a result, the piston valve 27 is shifted promptly downward to close the exhaust port 36 and reestablish the supply communication between the two portions of the straight-air pipe 15 when the pressure in the brake cylinder 11 reduces below the predetermined uniform low value of five pounds per square inch.

It will be noted that such supply communication is not reestablished by the release valve 16 until after the wheel which slipped has attained a speed corresponding to vehicle speed and, therefore, that the contact fingers 115 and 116 of switch device 88 of the wheel-slip responsive device 21 will have separated by the time that the piston valve 27 of the release valve 16 is returned to a position closing the exhaust port 36 and reestablishing communication between two portions of the straight-air pipe 15. In such case, therefore, with the valve 72 of the magnet valve 19 seated due to the denergization of the electromagnet 75, the resupply of fluid under pressure through the straight-air pipe to the brake cylinder 11 will not result in a subsequent operation of the pressure switch 18.

It will be evident that when the vented portion of the straight-air pipe 15 between the release valve 16 and the brake cylinder is reconnected to the portion of the straight-air pipe 15 which remains charged, the pressure of the fluid in the charged portion of the straight-air pipe reduces due to the flow of fluid under pressure from that portion to the uncharged portion and to the brake cylinder 11.

As previously explained, the self-lapping brake valve 13 operates automatically to maintain the pressure in the straight-air pipe 15 proportionate to the degree of displacement of the brake valve handle out of its normal position. Thus, when the pressure in the charged portion of the straight-air pipe 15 reduces, the brake valve 13 operates automatically to supply fluid under pressure into the straight-air pipe to restore a pressure therein and in the brake cylinder 11 corresponding to the degree of displacement of the brake valve handle out of its normal position.

As previously pointed out, the brake control apparatus constituting my present invention is adapted to be employed in connection with modern high speed train equipment in which a speed governor or retardation controller automatically operates to reduce the degree of application of the brakes on the train as the speed of the train reduces. Thus even though the brake valve handle 25 remains in the application position to which it was originally shifted, the actual pressure restored in the brake cylinder may be less than that which initiated the slipping of the vehicle wheels. Furthermore, even with or without such automatic devices the engineer of a train customarily reduces the degree of application of the brakes, as the speed of the car or train reduces, in order to compensate for the increase in the coefficient of friction between the brake shoes and wheels which takes place.

Accordingly, due either to the automatic operation of the speed governor or retardation controller device, or to the manual operation of the brake valve 13, the degree of pressure restored in the brake cylinder following the return of the slipping wheel to a speed corresponding to vehicle speed may be less than that which initiated the slipping of the wheel. Consequently, recurrence of slipping of the vehicle wheel is unlikely. However, if upon reapplication of the brakes the pressure in the brake cylinder associated with a slipping wheel again causes the wheel to slip, the brake control equipment will again function to vent fluid under pressure from the brake cylinder and subsequently resupply fluid under pressure thereto. In any case, the equipment constituting my invention definitely and positively prevents sliding of the vehicle wheel.

If, notwithstanding the rapid reduction of brake cylinder pressure effected automatically in response to the slipping of a vehicle wheel, the degree of application of the brakes is not reduced rapidly enough, due for example to friction in the brake rigging, it may happen that the vehicle wheel will decelerate to a relatively low speed before beginning to accelerate back toward a speed corresponding to vehicle speed. In such case, the switch device 18 may be operated to circuit-opening position in response to the sufficient reduction of the pressure in the brake cylinder, while the vehicle wheel is still accelerating at a sufficient rate to effect closing of the switch 88 of the wheel-slip responsive device 21. The electromagnet 75 of the magnet valve device 19 will thus be energized and fluid under pressure will be supplied to the chamber 64 of the pressure switch 18 from straight-air pipe 15 when the release valve 16 is operated to restore communication through the straight-air pipe in response to opening of the switch device 18. Thus switch device 18 will be operated instantly again to circuit-closing position and release valve 16 will be instantly operated to again vent fluid under pressure from the brake cylinder. Accordingly, it will be seen that in no case is pressure substantially in excess of the relatively low uniform value of five pounds per square inch permitted to be resupplied to the brake cylinder before the slipping wheel returns substantially to a speed corresponding to vehicle speed and the contact fingers 115 and 116 of the switch device 88 of the wheel slip responsive device 21 are separated. Consequently, reapplication of the brakes cannot be effected under any condition unless a slipping vehicle wheel has previously returned substantially to a speed corresponding to vehicle speed.

In the case of conventional clasp type wheel brakes employed on present day railway cars, it is well known that the fluid pressure in the operating brake cylinder must exceed five pounds per square inch before the brake shoes begin to exert a retarding force on the vehicle wheel. Thus, under the conditions just mentioned, even though fluid under pressure may be resupplied to the brake cylinder up to a pressure of five pounds per square inch, the brakes will not operate to exert a retarding force on the vehicle wheel because the pressure switch 18 does not permit the pressure to exceed five pounds per square inch as long as the switch 88 of the wheel-slip responsive device is closed.

Assuming that the car or train of cars has been brought to a stop due to application of the brakes and that the operator desires to release the brakes prior to again starting the car or train, this may be effected by returning the brake valve handle 25 to its release position. Fluid under pressure is as a result vented from the brake cylinder through the straight-air pipe under the control of the brake valve and the brakes are thus completely released.

In the event that the wheels of the traction car or locomotive race due to the application of propulsion power thereto, switch 88 of the wheel-slip responsive device may be operated to closed position. However, due to the fact that the brakes are released and pressure switch 22 consequently open, undesired energization of magnet valve device 19 and operation of release valve 16 is accordingly prevented.

Modified arrangement shown in Fig. 2

Referring to Fig. 2, a modified arrangement of the apparatus shown in Fig. 1 is disclosed wherein the fluid under pressure supplied to the chamber 64 of the pressure switch 18 under the control of the magnet valve 19 is from an independent source, such as a reservoir 138, instead of the straight-air pipe 15 and brake cylinder 11 as in Fig. 1. Reservoir 138 may be charged in any suitable manner as from a train pipe, not shown, connected to the main reservoir 12. The operation of the modified arrangement shown in Fig. 2 is otherwise the same as described for that of the equipment shown in Fig. 1 and is accordingly not repeated.

Figure 3:
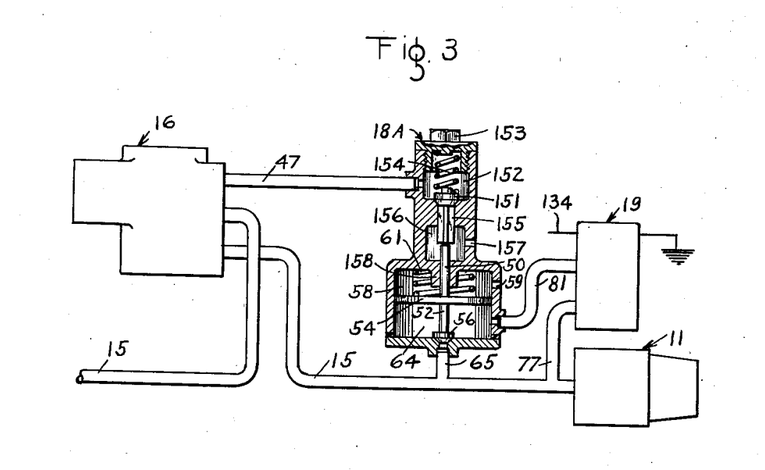

Embodiment shown in Fig. 3

The embodiment shown in Fig. 3 differs from that shown in Fig. 1 in the omission of the magnet valve device 17 and in the provision of a pressure operated valve device 18A in place of the pressure switch 18, and accordingly only so much of the embodiment is shown as is sufficient to point out the differences with respect to the equipment shown in Fig. 1.

The pressure operated valve device 18A is in part the same as the pressure switch 18 and thus corresponding parts in the valve device and switch are designated by the same reference numerals. Valve device 18A differs from pressure switch 18 in that the stem 58 of the operating piston 54 is effective, when the piston 54 is shifted upwardly, to unseat a valve 151 of the poppet type instead of operating the switch member 55. The casing of the valve device 18A is suitably formed to provide a chamber 152 in which the valve 151 is contained and which is constantly connected to the piston chamber 32 of the release valve 16 through the connecting pipe 47. Interposed between the valve 151 and a cap screw 153 screwed into the outer open end of the chamber 152 is a coil spring 154 which yieldingly urges the valve 151 into seated relation on an associated valve seat. The valve 151 has a fluted stem 155 which extends slidably through a suitable bore in the casing into a chamber 156 which is constantly open to atmosphere through port 157, the end of the fluted stem 155 being adapted to be engaged by the end of the stem 58 of the piston 54. The upward movement of the operating piston 54 from its normal position shown is limited by the engagement of the piston 54 with a downwardly extending boss 158 formed in the casing and extending downwardly into the chamber 58 so that the port 59 is not lapped or closed and so that the degree to which the valve 151 is unseated from the valve seat is correspondingly limited.

As in the equipment shown in Fig. 1, magnet valve 19 is arranged to cause fluid under pressure to be supplied from the straight-air pipe 15 and brake cylinder 11 to the chamber 64 beneath the operating piston 54 of the valve device 18A.

It will thus be understood that when the magnet valve device 18 is energized by current supplied over the wire 134 under the control of switch 88 of the wheel-slip responsive device 21, fluid under pressure is supplied to the chamber 64 to cause the operating piston 54 to be shifted upwardly to its upper limit position. Thus the valves 151 and 56 are simultaneously unseated, the valve 56 establishing direct communication from the straight-air pipe 15 and brake cylinder 11 to the chamber 64 of the valve device 18A and the valve 151 establishing an exhaust communication from the piston chamber 32 of the release valve 16 to atmosphere through port 157.

When the pressure in the straight-air pipe 15 and brake cylinder 11 reduces sufficiently, the spring 61 shifts the piston 54 downwardly to effect reseating of the valves 56 and 151. The reseating of the valve 151 isolates the piston chamber 32 of the release valve 16 and consequently the release valve 16 is operated to restore the supply communication to the brake cylinder, as in the equipment shown in Fig. 1.

The above description of the embodiment shown in Fig. 3 is believed sufficient when taken with the above description of the operation of the equipment shown in Fig. 1 so that an understanding of the complete operation of the embodiment shown in Fig. 3 may be had without further description.

Figure 4:
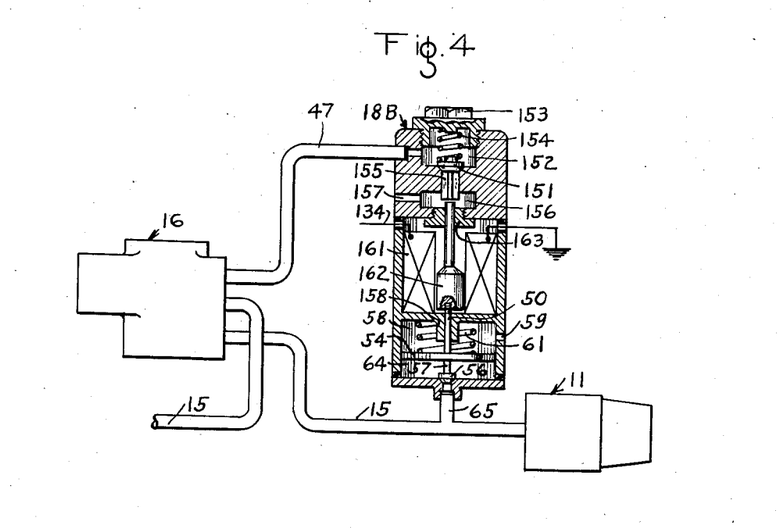

Embodiment shown in Fig. 4

In Fig. 4, another embodiment of my invention is shown which differs from that shown in Fig. 3 in omitting the magnet valve device 19 and in providing an electropneumatic valve device 18B in place of the pressure operated valve device 18A.

The electropneumatic valve device 18B is similar in part to the pressure operated valve device 18A and accordingly parts of the valve device 18B which correspond to those of the pressure operated valve device 18A are not described but are indicated by identical reference numerals. Essentially, the electropneumatic valve device 18B differs from the pressure operated valve device 18A in the addition of a solenoid or electromagnet winding 161 arranged so that, when it is energized, it magnetically actuates an associated plunger 162 upwardly to unseat the valve 161 and also to shift the piston 54 upwardly to effect unseating of the valve 56. As will be apparent from the drawings, the plunger 162 is screwed to the upper end of the stem 58 of the operating piston 54 and the upper reduced end of the plunger is guided in a suitable bushing 163 fixed in the casing, the upper end of the plunger extending into the chamber 156 and being adapted to engage the lower end of the fluted stem 155 of the valve 151.

The electromagnet winding 161 is arranged to be energized and deenergized under the control of the switch device 88 of the wheel-slip device 21 in exactly the same manner as is the electromagnet winding 75 of the magnet valve device 19 of previous embodiments. This is indicated by the fact that the one terminal of the electromagnet winding 161 is connected to the negative terminal of the battery 23 through a ground connection, in the manner indicated, and the other terminal is connected by the wire 134 to the contact finger 116 of the switch device 88 of the wheel-slip responsive device 21.

In operation, when the electromagnet winding 161 is energized, the plunger 162 is actuated upwardly by the magnetic force exerted thereon and consequently the valve 151 and 56 are simultaneously unseated to effect the same result as in the embodiment shown in Fig. 3. Since the valve 56 when unseated establishes a direct communicaion between the straight-air pipe 15 and the pressure chamber 64 of the electropneumatic valve device 18B, it will be seen that the valve 151 will be maintained unseated as long as the pressure in the straight-air pipe 15 and brake cylinder 11 exceeds the certain uniform low pressure of five pounds per square inch, notwithstanding deenergization of the electromagnet winding 161.

It is believed that the above description of the embodiment shown in Fig. 4 taken with the description of the operation of the embodiment shown in Fig. 1 will be sufficient to give a complete understanding as to the operation of the embodiment shown in Fig. 4 without further detailed description.

Figure 5:
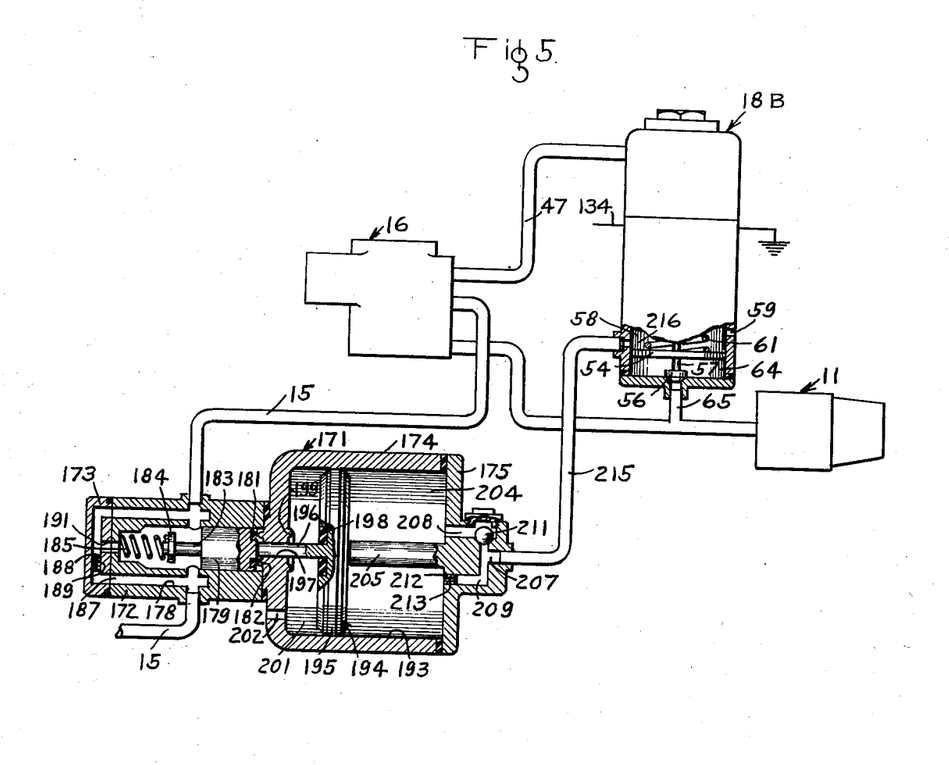
Fig. 5 is a fragmentary diagrammatic view illustrating a preferred embodiment of my invention which differs from the previous embodiments in providing means for controlling the rate of reapplication of brakes on a slipping wheel.

*Embodiment shown in Fig. 5*

In Fig. 5, is shown the preferred embodiment of my invention. This embodiment differs from the embodiment shown in Fig. 4, by the inclusion of a reapplication control valve device 171 for controlling the rate of resupply of fluid under pressure to the brake cylinder following relief of a wheel slipping condition.

This embodiment comprises in part the release valve 16 and the electropneumatic valve device 18B already described in the embodiment of Fig. 4 and accordingly the various elements of these devices shown in Fig. 5 are designated by corresponding reference numerals.

The reapplication control valve device 171 comprises a sectionalized casing having a valve section 172, a cover or end section 173 for the valve section 172, a piston section 174 and an end or check-valve section 175 for the piston section 174, all of the various casing sections being secured together in sealed relation, in the manner shown, by suitable bolts or screws not indicated.

The valve section of the casing 172 is provided with a bore 178 in which operates a piston valve 179. The piston valve 179 has inset therein at one end an annular gasket 181 which is adapted to seat on an annular rib seat 182 formed on the piston section 174 of the casing and extending into the open end of the bore 178. At the opposite end of the piston valve 179 is a stem 183 having a flange or collar 184 fixed thereto. A coil spring 185 is interposed between the collar 184 on the stem 183 and a shoulder formed at the end of the bore 178 for yieldingly urging the piston valve 179 in the right-hand direction into seated relation on the annular rib seat 182.

The piston valve 179 is arranged to control communication through that section of the straight-air pipe 15 which connects the brake valve 13 and the annular chamber 37 of the release valve 16. To this end, the portion of the straight-air pipe 15 just referred to is divided into two sections, that section connected to the brake valve 13 opening into the bore 178 at one point and that section of the straight-air pipe connected to the release valve 16 opening into the bore 178 at another point circumferentially spaced from but in alignment with the opening of the other section connected to the brake valve.

When the piston valve 179 is urged into seated relation on the annular rib seat 182, the opening of the two sections of the straight-air pipe 15 just referred to into the bore 178 are uncovered and consequently fluid under pressure may be supplied through the straight-air pipe 15 at a rapid rate under the control of the brake valve 13.

When the piston valve 179 is shifted in the left-hand direction in the manner presently to be described and thus unseated from the annular rib seat 182, the opening of the two sections of the straight-air pipe 15 into the bore 178 are lapped or covered and thus the supply of fluid under pressure through the straight-air pipe 15 under the control of the brake valve 13 is cut off except for a by-pass communication formed by a passage 187 around the piston valve 179 which extends through the cover section 173 of the casing. A choke element 188 having a restricted passage 189 therein is suitably secured to the cover section 173 within the passage 187 and serves to restrict the rate of supply of fluid under pressure through the straight-air pipe 15 under the control of the brake valve to a relatively slow rate, when the piston valve 179 is shifted in the left-hand direction to lap the openings of the two sections of the straight-air pipe 15 into the bore 178.

The passage 187 is connected through a short passage 191 into the bore 178 so that the pressure of the fluid supplied through the choke element 188 is effective on the left-hand face of the piston valve 179 to assist spring 185 in returning the piston valve 179 in the right-hand direction into seated relation on the annular rib seat 182.

The piston section 174 of the casing has a bore 193 in which operates a piston 194 which is relatively large in area compared to the cross-sectional area of piston valve 179. Piston 194 is provided with a suitable sealing ring 195 for engaging the surface of the casing within the bore 193 and is further provided with an axial stem 196 which extends slidably through a suitable opening 197 in the end wall of the casing section 174 into the bore 178 of the casing section 172 at a point within the annular rib seat 182. Thus, when the piston 194 is shifted in the left-hand direction from the position shown, the end of the stem 196 engages the end of the piston valve 179 at a point within the annular gasket 181 and shifts the valve in the left-hand direction against the yielding resisting force of the spring 185 and fluid pressure acting on the left-hand face of the piston valve if the straight-air pipe 15 is charged with fluid under pressure.

Inset in the face of the piston at the base of the stem 196 is an annular gasket 198 which is adapted to seat on an annular rib seat 199, formed on the end wall of the casing section 174 in surrounding relation to the stem 196, when the piston 194 is shifted sufficiently far in the left-hand direction.

Formed between the piston 194 and the end wall of the casing 174, that is at the left of the piston, is a chamber 201 which is constantly open to atmosphere through an exhaust port 202.

The gasket 198 is effective when seated on the annular rib seat 199 to prevent the leakage of fluid under pressure from the straight-air pipe 15 past the piston valve 179 and along the stem 196 through the bore 197 to the atmospheric chamber 201. The gasket 181 on piston valve 179 is effective when seated on the annular rib seat 182 to serve the same purpose.

Formed between the piston 194 and the end section 175 of the casing is a chamber 204 to which fluid under pressure is supplied and from which fluid under pressure is released under the control of the electropneumatic valve device 18B in the manner to be hereinafter explained. Centrally formed on or attached to the inner face of the end section 175 of the casing is a stem 205 which projects into the chamber 204 and serves as a stop to limit the movement of the piston 194 in the right-hand direction to an amount just sufficient to permit seating of the piston valve 179 on the annular rib seat 182.

Due to the fact that piston 194 is larger in area than the piston valve 179 and also to the fact that the major portion of the left-hand face of piston 194 remains subject to atmospheric pressure when the piston 194 seats on the annular rib seat 199, it will be seen that a relatively low fluid pressure acting on piston 194 in chamber 204 may be effective to hold piston valve 179 displaced in a position to lap the openings of the straight-air pipe into bore 178 against a relatively high fluid pressure acting through passage 191 on the left-hand face of the piston valve.

Formed in the end section 175 of the casing is a passage 207 which opens at the outer face of the casing section 175 and has two branches 208 and 209 each of which opens at the inner face of the casing section into the chamber 204. Contained in the branch 208 of the passage 207 is a one-way or check valve 211, illustrated as of the ball type, the check valve 211 being so arranged as to permit a rapid supply of fluid under pressure therepast into the chamber 204 and to prevent reverse flow of fluid under pressure therepast. Suitably secured to the casing section 175 within the branch 209 of the passage 207 is a choke element 212 having a restricted passage 213 therein. The choke element 212 serves to restrict the rate at which fluid under pressure may be vented from the chamber 204 thereby serving a purpose which will be made apparent hereinafter.

The passage 207 of the reapplication control valve device 171 is connected by a pipe 215 to a passage and port 216 which opens into the atmospheric chamber 58 of the electropneumatic valve device 18B at a point just above the piston 54. It will thus be seen that when the piston 54 of the valve device 18B is in its normal position shown, the chamber 204 of the reapplication control valve device 171 is vented to atmosphere through the exhaust port 59 of chamber 58. It will also be seen that, when the operating piston 54 is shifted upwardly in response to the energization of the electromagnet winding 161 (see Fig. 4), the piston 54 shifts to a point above the port 216 and accordingly the fluid under pressure in the brake cylinder 11 and straight-air pipe 15 flows at a rapid rate through the pipe 215 and past the check valve 211 into the chamber 204.

It will be understood that, as in the embodiment shown in Fig. 4, the electromagnet winding 161 of the electropneumatic valve device 18B is energized and deenergized under the control of the switch device 88 of the wheel-slip responsive device 21, this being indicated by the fact that the wire connected to one terminal of the electromagnet winding is designated as the wire 134 which, as indicated in Fig. 1, is connected to the contact finger 116 of the switch device 88.

*Operation of embodiment shown in Fig. 5*

Let it be assumed that an application of the brakes has been effected by operation of the brake valve 13 (see Fig. 1) and that the straight-air pipe 15 and brake cylinder 11 are thus charged with fluid at a pressure corresponding to the degree of displacement of the brake valve handle 35 out of release position. Let it be further assumed that while the brakes are applied as just described, a vehicle wheel on which the brakes are applied by the brake cylinder 11 begins to slip. The wheel-slip responsive device 21 (see Fig. 1) is accordingly operated and the switch 88 thereof closed to effect energization of the electromagnet 161 of the valve device 18B.

The piston 54 of the valve device 18B is shifted upwardly to effect unseating of the valves 56 and 151, as described for the embodiment shown in Fig. 4. The release valve 16 is instantly operated to close the supply communication through the straight-air pipe 15 and to vent fluid under pressure from the brake cylinder 11. Furthermore, the unseating of the valve 56 subjects the piston 54 of the valve device 18B to the pressure in the brake cylinder to maintain the valves 56 and 151 in unseated position as long as the pressure in the brake cylinder exceeds a certain uniform low pressure of for example five pounds per square inch.

In shifting to its upper position, the piston 54 of the valve device 18B connects the port 216 to the chamber 64 beneath the piston 54 and thus fluid under pressure is supplied from the brake cylinder 11 by way of chamber 64, pipe 215 and past the check valve 211 into the chamber 204 of the reapplication control valve device 171. It will be seen that the rate of reduction of brake cylinder pressure effected in response to slipping of the vehicle wheel in the embodiment shown in Fig. 5 is somewhat faster than the rate of reduction in brake cylinder pressure of the previous embodiments, due to the exhaust of fluid under pressure to the chamber 204 of the reapplication control valve device 171 in addition to the exhaust through port 36 of release valve 16.

The chamber 204 of the reapplication control valve device 171 is rapidly charged to a pressure somewhat below the original pressure established in the brake cylinder 11. This pressure is effective to exert a force on the piston 194 to shift it into seated relation on annular rib seat 199 and to shift the piston valve 179 in the left-hand direction to close the connection through bore 178 between the two sections of the straight-air pipe 15 against the combined opposing force of the spring 185 and the pressure established in the straight-air pipe 15 acting on the left-hand face of the piston valve 179 in the bore 178. It will thus be apparent that as long as the piston valve 179 is in the position just described, the supply of fluid under pressure through the straight-air pipe 15 will be limited to the restricted rate determined by the restricted passage 189 of the choke element 188 in the by-pass communication around the piston valve 179 through the passage 187. It should be understood that the restricted passage 189 is of larger flow area than the restricted passage 38 in operating piston 28 of the release valve 16 so as to permit the supply of fluid under pressure through the straight-air pipe 15 to the chamber 37 of the release valve device 16 to maintain sufficient upward force on the operating piston 28 to keep the piston valve 27 in its raised position in which fluid under pressure is vented from the brake cylinder 11.

As in the operation of the embodiment shown in Fig. 1, when the slipping wheel ceases deceleration due to the reduction of brake cylinder pressure and begins to accelerate back toward a speed corresponding to vehicle speed, the electromagnet winding 161 of the valve device 18B is momentarily deenergized due to the momentary opening of the switch 88 of wheel-slip responsive device 21. However, as in the case of the pressure switch 18 of the embodiment shown in Fig. 1, such momentary opening of the switch 88 is without effect because the brake cylinder pressure acting in the chamber 64 beneath the operating piston 54 of the valve device 18B maintains the piston 54 in its raised position and consequently maintains the valves 56 and 151 unseated. Consequently the release valve 16 remains conditioned to continue the reduction of pressure in the brake cylinder 11 notwithstanding acceleration of the slipping wheel back toward a speed corresponding to vehicle speed.

As stated in the operation of the equipment shown in Fig. 1, the slipping vehicle wheel accelerates rapidly back toward and attains a speed corresponding to vehicle speed before the pressure in the brake cylinder 11 and chamber 64 of the valve device 18B is reduced sufficiently to permit the return of the piston 54 downwardly to its normal position by the spring 61. Thus after the slipping vehicle wheel has returned fully to a speed corresponding to vehicle speed, the piston 54 is returned downwardly to effect seating of the valves 56 and 151. The reseating of the valve 151 causes the release valve 16 to be operated promptly to restore the supply communication through the straight-air pipe 15 to brake cylinder 11 while the reseating of valve 56 closes communication from brake cylinder 11 to chamber 64 of valve device 18B.

The size of the restricted passage 213 in the choke element 212 is such as to delay the exhaust of fluid under pressure from the chamber 204 of the reapplication control valve device 171 sufficiently that the fluid pressure remaining in the chamber 204 after the piston 54 of the valve device 18B is returned downwardly to its normal position maintains the piston 194 seated on the annular rib seat 199. Thus notwithstanding the return of the release valve 16 to its normal position restoring the supply communication through the straight-air pipe 15 to the brake cylinder 11, the rate of restoration of pressure in the straight-air pipe and in the brake cylinder 11 is determined by the rate of supply of fluid under pressure through the restricted passage 189 of the choke element 188 in the reapplication control valve device 171.

It will be seen that after the operating piston 54 of the valve device 18B is returned downwardly to a position in which the valve 56 is seated, the fluid remaining in the chamber 204 of the reapplication control valve device 171 continues to be vented to atmosphere through the choke element 212 and exhaust port 59 above the piston 54.

The flow area of the restricted passage 213 of the choke element 212 may be so selected in relation to the volume of the chamber 204 that the force exerted by the fluid pressure in the chamber 204 on the piston 194 will be reduced sufficiently to permit the return of the piston valve 179 in a right-hand direction into seated relation on the annular rib seat 182 while the car or train of cars is approaching a stop and before it is actually completely stopped, or it may be so selected that the pressure in chamber 204 is not sufficiently reduced to permit return of piston valve 179 to its normal position until after the car or train has been brought to a complete stop. In any case, when the piston valve 179 reopens the communication through the bore 178 connecting the two sections of the straight air pipe 15, it re-establishes communication through the straight-air pipe 15 whereby fluid under pressure may be rapidly resupplied to the brake cylinder 11, unless the pressure in the straight-air pipe 15 and brake cylinder 11 has been built up to its maximum restored value prior thereto.

As described in the case of the embodiment shown in Fig. 1, so also it must be understood that the equipment shown in Fig. 5 is in practice employed in a high speed train brake equipment having a speed governor or a retardation controller for automatically reducing brake cylinder pressure as the speed of the car or train reduces under an application of the brakes. Thus, due either to the automatic reduction in brake cylinder pressure or to operation of the brake valve 13 to reduce the pressure in the straight-air pipe 15, as in the case of the equipment shown in Fig. 1, the ultimate pressure restored in the brake cylinder may be less than that which initiated the slipping of the vehicle wheels so that the possibility of recurrence of slipping of the vehicle wheels is minimized.

It will be apparent also that in the case of the equipment shown in Fig. 5, the restriction of the rate of resupply of fluid under pressure to the brake cylinder, following slipping of the vehicle wheel, also tends to minimize the likelihood of recurrence of wheel slipping, because reapplication of the brakes to an appreciable degree is not effected before a slipping wheel returns fully to a speed corresponding to vehicle speed.

The restriction of the resupply of fluid under pressure to the brake cylinder associated with a vehicle wheel which has slipped is also effective to prevent undesirable slack action in a train of cars. It will be apparent that, if the brakes associated with the wheel and axle units on different cars are suddenly released and then suddenly reapplied under the control of wheel slipping means associated with the wheels on the different cars of the train, the slack between successive cars may run in or out with some degree of severity. Thus, by restricting the rate of resupply to the brake cylinder the possibility of severe running in or running out of slack between cars is minimized.

In the case of certain types of high speed trains having a relatively few number of cars of the so-called articulated type, the problem of slack action will of course not arise, but the sudden reapplication and sudden release of the brakes on wheel and axle units of different cars may result in an undesirable jerking or bucking of the cars causing discomfort to passengers. The slow rate of reapplication however tends to minimize this undesirable bucking action and cause smooth braking action.

Since the piston valve 179 of the reapplication control valve device 171 is automatically restored to its normal position as previously described, the brakes may be rapidly released when it is desired to again start the car or train after it has been brought to a stop, by operating the brake valve handle 25 to release position. In such case, fluid under pressure is vented from the brake cylinder through the straight-air pipe 15 to atmosphere at the brake valve 13, complete release of the brakes being thereby effected.

It will be understood that the pressure switch 22 shown in Fig. 1 is also a part of the equipment of the embodiment shown in Fig. 5 although it is not shown in Fig. 5. As in the case of the equipment shown in Fig. 1, the pressure switch 22 is effective to prevent undesired completion of the electrical circuits and consequent energization of electroresponsive devices operative on such circuits when the switch 88 of the wheel-slip responsive device 21 is closed due to racing of the wheels of the traction car or locomotive of the train caused by the application of propulsion power to the car or train.

Summary

Summarizing, it will be seen that I have disclosed various embodiments of my invention, all of which embody a common principle, namely the prevention by means under the control of brake cylinder pressure of the reapplication of the brakes on a slipping wheel until after the slipping wheel has returned to a speed corresponding to vehicle speed. In all of the various embodiments, a device is provided which is normally unresponsive to the pressure in the brake cylinder but which is rendered responsive to brake cylinder pressure once a vehicle wheel begins to slip. Only a momentary impulse is required to be transmitted in response to slipping of a vehicle wheel to cause the pressure responsive device to be thereafter responsive to brake cylinder pressure, and the device is so arranged as to insure the reduction of pressure in a brake cylinder associated with the slipping wheel to a certain uniform low pressure notwithstanding variation in the rotative condition of the vehicle wheel effected in response to the reduction of brake cylinder pressure. Thus the slipping vehicle wheel may return to a speed corresponding to vehicle speed before reapplication of the brakes on the slipping wheel will be effected.

In the preferred embodiment of my invention shown in Fig. 5, a reapplication control valve device is provided which is operated by fluid under pressure vented from the brake cylinder, in response to the slipping of a vehicle wheel, to a position for restricting the rate of resupply of fluid under pressure to the brake cylinder which is effected automatically after the pressure in the brake cylinder has reduced to the certain uniform low pressure determined by the pressure responsive device.

While I have illustrated my invention in simple diagrammatic form in connection with only one brake cylinder, the manner of adaptation and application thereof to a brake control equipment for a train of cars will be readily apparent, as will other additions or modifications, without departing from the spirit of my invention. It is accordingly not my intention to limit the scope of my invention except as it is necessitated by the scope of the prior art.

Having now described my invention, what I claim as new and desire to secure by Letters Patent, is:

1. A vehicle brake equipment comprising manually controlled means for effecting application and release of the brakes associated with the vehicle wheels, additional means effective while the manually controlled means is conditioned to cause application of the brakes for effecting release of the brakes and reapplication of the brakes on a vehicle wheel, means operatively responsive to the slipping of a vehicle wheel, and means operated in response to the operation of the wheel-slip responsive means for effecting operation of the said additional means to effect release of the brakes on the slipping wheel and so controlled thereafter by the degree of application of the brakes on the slipping wheel as to cause operation of the additional means to effect reapplication of the brakes on the slipping wheel only after the application of the brakes on the slipping wheel has been reduced below a certain uniform degree.

2. A vehicle brake equipment comprising a brake cylinder, manually controlled means for causing fluid under pressure to be supplied to and released from the brake cylinder to effect application and release of the brakes respectively associated with the vehicle wheels, valve means operative to cut off the supply of fluid under pressure to the brake cylinder as effected under the control of the manually controlled means and to vent fluid under pressure from the brake cylinder, means operatively responsive to the slipping of a vehicle wheel, and means so controlled by the wheel-slip responsive means as to cause the said valve means to operate to vent fluid under pressure from the brake cylinder when a vehicle wheel begins to slip and effective thereafter independently of the wheel-slip responsive means and as long as the pressure in the brake cylinder exceeds a certain uniform pressure for causing said valve means to continue to vent fluid under pressure from the brake cylinder.

3. A vehicle brake equipment comprising a brake cylinder, manually controlled means for causing fluid under pressure to be supplied to and released from the brake cylinder to effect application and release of the brakes respectively associated with the vehicle wheels, valve means operative to cut off the supply of fluid under pressure to the brake cylinder as effected under the control of the manually controlled means and to vent fluid under pressure from the brake cylinder, means operatively responsive to the slipping of a vehicle wheel, and means controlled by the wheel-slip responsive means for causing the valve means to vent fluid under pressure from the brake cylinder when a vehicle wheel begins to slip and controlled thereafter independently of the wheel-slip responsive means by the pressure in the brake cylinder for causing the valve means to operate to its normal condition permitting the resupply of fluid under pressure to the brake cylinder under the control of the manually controlled means only after the pressure in the brake cylinder has been reduced below a certain uniform pressure.

4. A vehicle brake equipment comprising a brake cylinder, manually controlled means for causing fluid under pressure to be supplied to and released from the brake cylinder to effect application and release respectively of the brakes associated with the vehicle wheels, additional means for releasing fluid under pressure from the brake cylinder and effecting the resupply of fluid under pressure to the brake cylinder while the manually controlled means is conditioned to supply fluid under pressure to the brake cylinder, means operatively responsive to the slipping of a vehicle wheel, and fluid pressure responsive means for controlling the operation of the additional means, said fluid pressure responsive means being operated initially in response to the operation of the wheel-slip responsive means for causing the additional means to release fluid under pressure from the brake cylinder and controlled thereafter independently of the wheel-slip responsive means by the pressure in the brake cylinder so as to cause operation of the additional means to effect reapplication of the brakes on the slipping wheel only when the pressure in the brake cylinder reduces below a certain uniform pressure.

5. A vehicle brake equipment comprising a brake cylinder, manually controlled means for causing fluid under pressure to be supplied to and released from the brake cylinder to effect application and release respectively of the brakes associated with the vehicle wheels, additional means for effecting release of fluid under pressure from the brake cylinder and resupply of fluid under pressure from the brake cylinder while the manually controlled means is conditioned to supply fluid under pressure to the brake cylinder, means operatively responsive to the slipping of a vehicle wheel, fluid pressure responsive means normally unresponsive to the pressure in the brake cylinder, and means controlled by the wheel-slip responsive means and effective when a vehicle wheel begins to slip for causing said fluid pressure responsive means to operate to cause operation of the additional means to release fluid under pressure from the brake cylinder and to condition the fluid pressure responsive means so as to be responsive to the pressure in the brake cylinder so that it thereafter remains effective to cause the additional means to continue to vent fluid under pressure from the brake cylinder independently of the wheel-slip responsive means as long as the pressure in the brake cylinder exceeds a certain uniform pressure.

6. A vehicle brake equipment comprising a brake cylinder, means operative to cause fluid under pressure to be supplied to and released from the brake cylinder to effect application and release respectively of the brakes associated with the vehicle wheels, valve means normally conditioned to establish communication through which fluid under pressure is supplied to the brake cylinder and operative to close said supply communication and vent fluid under pressure from the brake cylinder, a valve device including a chamber and an operating abutment normally biased to a certain position and operative out of the normal position thereof in response to a fluid pressure in the chamber exceeding a certain uniform low pressure, a valve operated by said abutment and effective in the normal position of the abutment to close communication between the brake cylinder and the chamber of said valve device and effective to establish communication between the brake cylinder and said chamber upon operation of the abutment out of its normal position, said valve device being effective when the abutment thereof is operated out of its normal position to cause operation of said valve means to vent fluid under pressure from the brake cylinder, and means responsive to the slipping of a vehicle wheel for causing fluid under pressure to be supplied to the chamber of said valve device to initiate operation of the abutment out of its normal position, said abutment being thereafter maintained out of its normal position by the pressure in the brake cylinder as long as the brake cylinder pressure exceeds said certain uniform low pressure, independently of the wheel-slip responsive means.

7. A vehicle brake equipment comprising a brake cylinder, valve means normally in a position to establish communication through which fluid under pressure is supplied to the brake cylinder to effect application of the brakes and operative out of said position to close said communication and vent fluid under pressure from the brake cylinder, a valve device for controlling the operation of the valve means, means responsive to the slipping of a vehicle wheel associated with the brake cylinder, and means controlled by the wheel-slip responsive means to cause operation of the valve device resulting in operation of the valve means to vent fluid under pressure from the brake cylinder and effective to render said valve device controllable thereafter by the pressure in the brake cylinder independently of the wheel-slip responsive means.

8. A vehicle brake equipment comprising a brake cylinder, valve means normally establishing communication through which fluid under pressure is supplied to the brake cylinder to effect application of the brakes and release of the brakes and operative to a different position to close said communication and to vent fluid under pressure from the brake cylinder, a valve device for controlling the operation of the valve means, an electroresponsive device for effecting operation of the valve device to cause the valve means to vent fluid under pressure from the brake cylinder, and means rendered subject to brake cylinder pressure when the valve device is operated to cause the valve means to vent fluid under pressure from the brake cylinder for thereafter maintaining the valve device effective to cause the valve means to continue to vent fluid under pressure from the brake cylinder as long as the pressure in the brake cylinder exceeds a certain uniform low pressure independently of the electroresponsive means.

9. A vehicle brake equipment comprising means for effecting application and release of the brakes associated with a vehicle wheel, a device having an element rotatable according to the speed of rotation of the vehicle wheel and a rotary inertia element associated with the rotary element and having a normal position relative thereto, said inertia element being shiftable out of its normal position rotatively ahead of the rotary element when the vehicle wheel decelerates while slipping and shiftable out of its normal position rotatively behind the rotary element when the vehicle wheel accelerates while slipping, means controlled by the relative rotary movement between the rotary element and the rotary inertia element for causing release of the brakes on the vehicle wheel while the first said means is conditioned to cause application of the brakes thereon, and means normally unresponsive to the pressure in the brake cylinder adapted to be rendered responsive to the pressure in the brake cylinder upon the first relative rotary movement between the rotary element and the rotary inertia element and effective to cause said last means to continue releasing the brakes notwithstanding the momentary return of the rotary inertia element to its normal position with respect to the rotary element when a slipping vehicle wheel changes from deceleration to acceleration while slipping.

10. A vehicle brake equipment comprising means for effecting application and release of the brakes associated with a vehicle wheel, additional means operative upon slipping of said vehicle wheel to effect the release and subsequently the reapplication of the brakes on said vehicle wheel while the first said means is conditioned to cause application of the brakes on the vehicle wheels, and means normally ineffective to control the rate of increase in the degree of application of the brakes on said wheel adapted to be conditioned upon the slipping of said wheel to thereafter control the rate of reapplication of the brakes on said wheel.

11. A vehicle brake equipment comprising a brake cylinder, means providing a communication through which fluid under pressure is supplied to and released from the brake cylinder to effect application and release respectively of the brakes associated with a vehicle wheel, valve means operative out of a normal position in which fluid under pressure may be supplied through the said communication to the brake cylinder to a different position in which the said communication is closed and fluid under pressure is vented from the brake cylinder, a second valve means normally in a position to enable the rapid supply of fluid under pressure through the said communication and operative to a different position to restrict the rate of supply of fluid under pressure through the said communication, and means responsive to the slipping of a vehicle wheel for controlling the operation of both of said valve means.

12. A vehicle brake equipment comprising a brake cylinder, means providing a communication through which fluid under pressure is supplied to and released from the brake cylinder to effect application and release respectively of the brakes associated with a vehicle wheel, valve means operative out of a normal position in which said communication is open to a different position in which said communication is closed and a different communication is established through which fluid under pressure is vented from the brake cylinder, a second valve means normally in a position to enable the rapid supply of fluid under pressure through said communication to the brake cylinder and operative to a different position to restrict the rate of supply of fluid under pressure through the said communication to the brake cylinder, means responsive to the slipping of the vehicle wheel, and means controlled by the wheel-slip responsive means for effecting operation of the first valve means to vent fluid under pressure from the brake cylinder and effective thereafter independently of the wheel-slip responsive means to cause the first valve means to vent fluid under pressure from the brake cylinder as long as the pressure in the brake cylinder exceeds a certain uniform low pressure, said last means being effective when operated in response to the control of the wheel-slip responsive means to effect operation of the said second valve means to a position for restricting the rate of supply of fluid under pressure through the said communication to the brake cylinder.

13. A vehicle brake equipment comprising a brake cylinder, means providing a communication through which fluid under pressure is supplied to and released from the brake cylinder to effect application and release respectively of the brakes associated with a vehicle wheel, valve means normally in a position to open said communication and operative to a position to close said communication and vent fluid under pressure from the brake cylinder, a second valve means normally in a position to enable the rapid supply of fluid under pressure through the said communication to the brake cylinder and operative to a different position to restrict the rate of supply of fluid under pressure to the brake cylinder, means operative in response to the slipping of the vehicle wheel, means controlled by the wheel-slip responsive means and operated in response to the initiation of slipping of the vehicle wheel for causing operation of the first said valve means to vent fluid under pressure from the brake cylinder, and means operatively conditioned in response to the operation of said last means to maintain the last said means in position to cause the first said valve means to vent fluid under pressure from the brake cylinder as long as the pressure in the brake cylinder exceeds a certain uniform low pressure and effective to control the supply of fluid under pressure to the said second valve means to cause it to operate to its said different position wherein it restricts the rate of resupply of fluid under pressure through the said communication to the brake cylinder.

14. In a vehicle brake equipment comprising a brake cylinder, means providing a communication through which fluid under pressure is supplied to and released from the brake cylinder to effect application and release respectively of the brakes associated with a vehicle wheel, means operative in response to the initiation of slipping of the vehicle wheel and controlled thereafter by fluid pressure in the brake cylinder to cause fluid under pressure to be vented from the brake cylinder during an application of the brakes until the pressure in the brake cylinder reduces below a predetermined uniform low pressure, and means normally conditioned to permit the rapid supply of fluid under pressure through the communication to the brake cylinder adapted to be conditioned in response to the operation of the last said means upon slipping of the vehicle wheel to thereafter restrict the rate of supply of fluid under pressure through the communication to the brake cylinder.

15. A vehicle brake equipment comprising a brake cylinder, means providing a communication through which fluid under pressure is supplied to and released from the brake cylinder to effect application and release respectively of the brakes associated with a vehicle wheel, means operative in response to the slipping of the vehicle wheel to close said communication and vent fluid under pressure from the brake cylinder and effective thereafter to restore said communication, and means normally conditioned to permit the rapid supply of fluid under pressure through the said communication to the brake cylinder and operatively conditioned in response to the slipping of a vehicle wheel to restrict the rate of resupply of fluid under pressure through said communication to the brake cylinder.

16. A vehicle brake equipment comprising a brake cylinder, means providing a communication through which fluid under pressure is supplied to and released from the brake cylinder to effect application and release respectively of the brakes associated with a vehicle wheel, valve means controlling the supply of fluid under pressure through the said communication to the brake cylinder effective normally to permit a certain rate of supply and when in a different position to permit a lesser rate of supply through the communication, means operative in response to the slipping of a vehicle wheel for effecting operation of the valve means to its said different position, and means for maintaining said valve means in said different position independently of the wheel-slip responsive means.

17. A vehicle brake equipment comprising a brake cylinder, means providing a communication through which fluid under pressure is supplied to and released from the brake cylinder to effect application and release respectively of the brakes associated with a vehicle wheel, valve means controlling the supply of fluid under pressure through the said communication to the brake cylinder effective normally to permit a certain rate of supply and when in a different position to permit a lesser rate of supply through the communication, means operative in response to the slipping of a vehicle wheel for effecting operation of the valve means to its said different position, and means for maintaining said valve means in its said different position for a limited time independently of the operation of the wheel-slip responsive means in response to cessation of slipping of the vehicle wheel.

18. In a vehicle brake equipment comprising a brake cylinder, means providing a communication through which fluid under pressure is supplied to and released from the brake cylinder to effect application and release respectively of the brakes associated with the vehicle wheel, fluid pressure operated valve means having a chamber and operative in response to supply of fluid under pressure to the said chamber from one position in which it permits a rapid supply of fluid under pressure through the communication to the brake cylinder to a different position in which a lesser rate of supply of fluid under pressure through the communication to the brake cylinder is permitted, means operative upon the initiation of slipping of a vehicle wheel for rapidly supplying fluid under pressure to said chamber to cause operation of the valve means to its said different position, and means for venting fluid under pressure from said chamber at a restricted rate.

19. A vehicle brake equipment comprising a brake cylinder, means providing a communication through which fluid under pressure is supplied to and released from the brake cylinder to effect application and release respectively of the brakes associated with the vehicle wheel, fluid pressure operated valve means having a chamber and operative in response to the charging of said chamber with fluid at a relatively low pressure from one position in which it permits the supply of fluid under pressure through the communication to the brake cylinder at a relatively rapid rate to a different position in which it permits the supply of fluid under pressure through the communication to the brake cylinder at a relatively slow rate, means operative in response to the initiation of slipping of a vehicle wheel for causing said chamber to be rapidly charged with fluid under pressure from the brake cylinder at the time the slipping of the wheel begins to cause operation of the valve to its said different position, and means for venting fluid under pressure from said chamber at a restricted rate for maintaining sufficient pressure in said chamber to maintain the valve means in its said different position for a limited time.

20. In a vehicle brake equipment, means providing a communication through which fluid under pressure may be supplied at a certain rate to effect application of the brakes on a vehicle wheel, valve means normally in a position to permit the supply of fluid under pressure through said communication at the said certain rate and operative to a different position in which it is effective to prevent the supply of fluid under pressure through said communication except at a rate lower than said certain rate, and means effective in response to the slipping of the vehicle wheel to cause operation of the said valve means to its said different position.

21. In a vehicle brake equipment, means providing a communication through which fluid under pressure may be supplied at a certain rate to effect application of the brakes on a vehicle wheel, valve means normally in a position to permit the supply of fluid under pressure through said communication at the said certain rate and operative to a different position in which it is effective to prevent the supply of fluid under pressure through said communication except at a rate lower than said certain rate, means effective in response to the slipping of the vehicle wheel to cause operation of the said valve means to its said different position, and means effective to maintain said valve means in its said different position for at least a certain limited time.

22. A vehicle brake equipment comprising a brake cylinder, means for causing fluid under pressure to be supplied to the brake cylinder and released therefrom to effect application and release of the brakes associated with the vehicle wheel, valve means operative out of the normal position in which it establishes communication through which fluid under pressure is supplied to the brake cylinder to a different position in which it closes the supply communication and establishes a different communication through which fluid under pressure is released from the brake cylinder, a magnet valve device for controlling the operation of said valve means, fluid pressure operated switch means controlling said magnet valve device, and means responsive to the slipping of a vehicle wheel effective when a vehicle wheel begins to slip to cause operation of the fluid pressure operated switch out of the normal position to a different position, said fluid pressure operated switch device being rendered subject to brake cylinder pressure once it is operated out of its normal position so that the switch device is thereafter maintained out of its normal position as long as the brake cylinder pressure exceeds a certain uniform low pressure, independently of the control of the wheel-slip responsive means.

23. A vehicle brake equipment comprising a brake cylinder, means operative to cause fluid under pressure to be supplied to and released from the brake cylinder to effect application and release respectively of the brakes associated with vehicle wheels, a normally deenergized magnet valve device effective when deenergized to cause communication to be maintained through which fluid under pressure is supplied to the brake cylinder and effective when energized to cause said communication to be closed and another communication to be established through which fluid under pressure is vented from the brake cylinder, means effective to cause energization of said magnet valve device when a vehicle wheel begins to slip, and means normally unresponsive to brake cylinder pressure adapted to be rendered responsive to brake cylinder pressure once a vehicle wheel slips for maintaining said magnet valve device energized as long as the brake cylinder pressure exceeds a certain uniform low pressure independently of the rotative condition of the vehicle wheel.

24. A vehicle brake equipment comprising a brake cylinder, means for causing fluid under pressure to be supplied to and released from the brake cylinder to effect application and release respectively of the brakes associated with a vehicle wheel, a normally deenergized magnet valve device effective when deenergized to cause communication to be maintained through which fluid under pressure is supplied to the brake cylinder and effective when energized to cause the said communication to be closed and another communication to be established through which fluid under pressure is vented from the brake cylinder, a fluid pressure operated switch device having a chamber and operative upon the supply of fluid under pressure to said chamber to cause energization of said magnet valve device, and a valve operated in response to the supply of fluid under pressure to the chamber of said switch for establishing communication between said chamber and the brake cylinder, and means operative in response to the slipping of a vehicle wheel for causing fluid under pressure to be supplied to the chamber of the fluid pressure operated switch, said fluid pressure operated switch being thereafter subject to the pressure of the brake cylinder under the control of said valve and maintained in an operative position to maintain energization of said magnet valve device independently of the interruption of the supply of fluid under pressure to said chamber under the control of the wheel-slip responsive means.

CLYDE C. FARMER.